Figure 1:
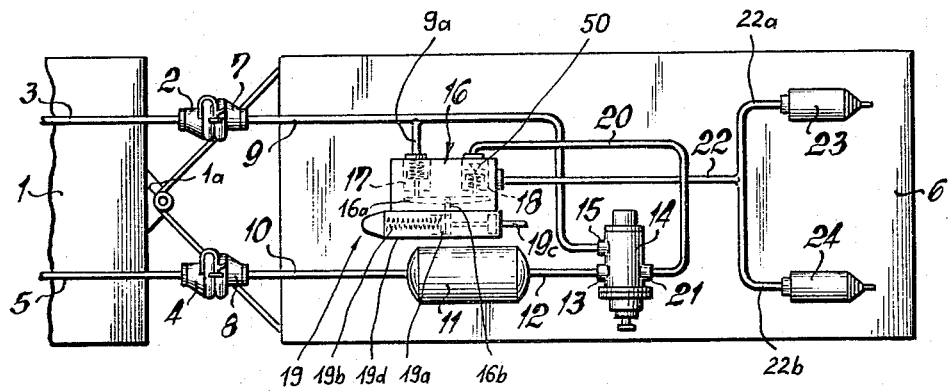

Sept. 27, 1966  O. VIELMO ETAL  3,275,385

BRAKE SYSTEMS FOR AUTOMOTIVE VEHICLES

Filed Aug. 16, 1965

INVENTORS
OSKAR VIELMO
KURT MÜLLER

BY

Michael J. Striker
their ATTORNEY

United States Patent Office 3,275,385
Patented Sept. 27, 1966

3,275,385
BRAKE SYSTEMS FOR AUTOMOTIVE VEHICLES
Oskar Vielmo, Stuttgart-Sonnenberg, and Kurt Müller, Schnait, Germany, assignors to Robert Bosch G.m.b.H., Stuttgart, Germany
Filed Aug. 16, 1965, Ser. No. 480,201
Claims priority, application Germany, Aug. 14, 1964, B 78,103
4 Claims. (Cl. 303—30)

The present invention relates to a brake system for automotive vehicles, and more particularly to an improved dual brake system which operates with compressed fluid. Still more particularly, the invention relates to a novel control valve assembly which may be utilized in the brake systems of trailers and/or towing vehicles.

It is an important object of the present invention to provide an air-actuated braking system with a valve assembly which can control the flow of compressed fluid to one or more brake cylinders from two separate sources and which can automatically shift to delivery of fluid from the second of two sources when the pressure of fluid coming from the first source drops below a predetermined minimum value.

Another object of the invention is to provide an air-actuated brake system which can automatically shift from delivery of compressed air out of the supply line to delivery out of the service line when the pressure in the supply line drops below a predetermined minimum value.

A further object of the invention is to provide a control valve assembly which can automatically shift from delivery of compressed fluid out of a first source to the delivery of compressed fluid out of a second source when the pressure in the first source does not suffice to insure satisfactory braking action.

An additional object of the invention is to provide a control valve assembly which can be readily installed in many existing air-actuated brake systems and which is particularly suited for use in the brake system of a trailer.

Still another object of the invention is to provide a brake system which embodies the improved valve assembly and wherein the rate at which compressed air can enter one or more brake cylinders can be controlled in dependency on the load upon the vehicle.

A concomitant object of the invention is to provide a brake system for trailers of the type which are provided with a reservoir for compressed air and to construct and assemble the brake system in such a way that the reservoir is automatically sealed from the brake cylinders if the pressure of air in such reservoir drops below a pressure which is necessary for proper braking action.

Another object of the invention is to provide a so-called self-sealing brake system which will automatically seal off a leaky line and which will automatically supply the brake cylinders with compressed air from that source wherein the air is maintained at requisite pressure.

An additional object of the invention is to provide a brake system of the above outlined characteristics which, though very practical in trailers, may be used with equal advantage in tractors, trucks and other types of automotive vehicles.

Briefly stated, one feature of our present invention resides in the provision of an improved brake system which is particularly useful in trailers and which preferably operates with compressed air. In its simplest form, the brake system comprises a first and a second line or conduit each of which is arranged to deliver a compressed braking fluid, and a control valve assembly which comprises a housing provided with first and second inlets which are respectively connected with the discharge ends of the first and second lines, with an outlet which conveys the fluid to one or more brake cylinders, and with first and second passages which respectively connect the outlet with the first and second inlets. The control valve assembly further comprises a normally closed first valve provided in the housing to seal the outlet from the first inlet, a pressure-responsive second valve provided in the housing and arranged to open in response to a predetermined minimum fluid pressure in the second line to allow the flow of compressed fluid through the second passage and onto the outlet, and motion transmitting means for opening the first valve in response to closing of the second valve so that the outlet receives fluid from the first line when the pressure in the second line drops below the predetermined minimum pressure.

The first line is preferably the service line which connects to the reservoir of the towing vehicle, and the second line is then a supply line which receives compressed fluid from a reservoir mounted on the trailer. When the reservoir of the trailer is empty or when the second line is leaky, the control valve assembly will allow compressed fluid to flow from the reservoir of the towing vehicle and to one or more brake cylinders which are connected with the outlet. The connection between the outlet and the brake cylinder or cylinders contains a second valve which preferably cooperates with means for adjusting the admission of fluid to the brake cylinders in dependency on the load upon the trailer and which works solely as a load responsive or pressure regulating valve, when the pressure in the second line drops below a predetermined minimum pressure and which works additionally as a relay valve if the pressure in the second line is maintained at a predetermined setting.

Figure 2:
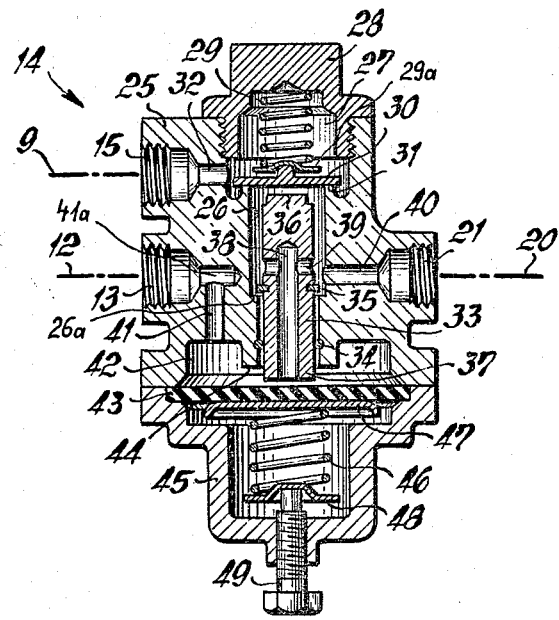

The novel features which are considered as characteristic of the invention are set forth in particular in the appended claims. The improved brake system itself, however, both as to its construction and its mode of operation, together with additional features and advantages thereof, will be best understood upon perusal of the following detailed description of a specific embodiment with reference to the accompanying drawings, in which:

FIG. 1 is a diagrammatic view of a brake system which embodies our invention and which is installed in a trailer, a portion of the towing vehicle for the trailer being broken away; and FIG. 2 is an enlarged longitudinal section through the control valve assembly of the improved brake system.

Referring first to FIG. 1, there is shown a portion of a towing vehicle 1 and a trailer 6. The numeral 3 denotes a service line which conveys compressed fluid, preferably compressed air, from the brake valve (not shown) of the towing vehicle 1 to a detachable coupling including cooperating coupling elements 2 and 7. The coupling element 7 is connected with the intake end of a service line 9 leading to a load responsive valve 16 and to a control valve assembly 14 which latter is constructed and assembled in accordance with our present invention. A supply line 5 leads from the reservoir (not shown) of the towing vehicle 1 on to a reservoir 11 of the trailer 6. A second coupling including cooperating coupling elements 4 and 8 connects the discharge end of the supply line 5 with the intake end of a second supply line 10. A hitch 1a connects the towing vehicle 1 to the forward end of the trailer 6. The construction of the couplings 2, 7 and 4, 8 forms no part of the present invention; such couplings may be constructed in a well known manner as disclosed in U.S. Patent No. 2,250,199 of John T. Kelly.

The supply line 10 of the trailer 6 comprises an extension 12 which leads from the reservoir 11 and whose discharge end is connected with a first inlet 13 of the valve assembly 14. The discharge end of the service line 9 is connected to a second inlet 15 of the valve assembly 14, the latter further comprising a single outlet 21 which is connected with the intake end of a supply line 20 leading on to the load responsive valve 16 and from there to two brake cylinders 23 and 24 for the rear wheels of the trailer 6. The supply line 9 further comprises a branch line 9a which leads to a starting or actuating cylinder 17 of the load responsive valve 16. The load responsive valve 16 may be designed in a manner as disclosed in the French Patent No. 1,340,687. The load responsive valve 16 comprises a regulating cylinder 18 which initiates the admission of compressed air from the supply line 20 at a feed line 22 at the rate determined by the load upon the trailer 6. The feed line 22 comprises two branches 22a, 22b which respectively supply compressed air to the brake cylinders 23, 24. The numeral 19 denotes an adjusting or compensating device serving to determine the rate at which the piston of the regulating cylinder 18 opens a supply valve 50 which then admits compressed air from the supply line 20 to the feed line 22. The construction of the adjusting or compensating device 19 is known in the art and by itself forms no part of the present invention. The same holds true for the entire load responsive valve 16 which is shown as comprising a balance beam 16a having a fulcrum 16b connected to a piston 19a forming part of the adjusting device 19. The adjusting device further comprises a spring 19b which biases the piston 19a in a direction to the right, as viewed in FIG. 1, and connecting conduit 19c which may admit compressed air to thereby shift the fulcrum 16b longitudinally of the cylinder 19d and to change the effective length of the two arms of the balance beam 16a. When the operator in the cab of the towing vehicle steps on the brake pedal, a stream of compressed air flows through the service lines 3, 9 and into the branch line 9a to depress the piston in the actuating cylinder 17 and to tilt the balance beam 16a in a counterclockwise direction whereby the piston of the regulating cylinder 18 opens the supply valve 50 to allow for flow of compressed air from the supply line 20 into the feed line 22 whence the air flows through the branch lines 22a, 22b and into the brake cylinders 23, 24 so that the trailer 6 is braked with a force whose magnitude depends on the axial position of the piston 19a in the cylinder 19d of the adjusting device 19. The position of the fulcrum 16b will determine the extent to which the supply valve 50 opens in response to admission of compressed air from the branch line 9a into the actuating cylinder 17.

The control valve assembly 14 can also be called a switch-over valve or safety valve because it can switch from delivery of compressed air through the supply line 10, 12 to delivery of compressed air through the service line 9, such air then flowing through the supply line 20 and onto the supply valve 50.

The construction of the valve assembly 14 is shown in FIG. 2. This valve assembly comprises a housing 25 which is provided with the aforementioned inlets 13, 15 connected to the discharge ends of the lines 12 and 9 respectively, and with the single outlet 21 which delivers compressed air to the supply line 20 as soon as the operator steps on the brake pedal to admit compressed air into the service line 9. The housing 25 further defines two separate passages which respectively connect the outlet 21 with the inlets 13 and 15. The passage leading from the inlet 15 to the outlet 21 includes a radial bore 32 communicating with the inlet 15 and leading into a chamber 27, an axial bore 26 which communicates with the chamber 27, and a second radial bore 40 which connects the axial bore 26 with the outlet 21. The other passage comprises a radial bore 41a which leads inwardly from the inlet 13, an axially parallel bore 41 which communicates with the radial bore 41a, a chamber 42 which communicates with the bore 41, an axially extending blind bore 38 provided in a rod-shaped motion transmitting member 33, and a diametral bore 39 which connects the blind bore 38 with the axial bore 26. Thus, the two passages have a common portion which leads into the outlet 27. However, it is clear that the second passage could deliver compressed air all the way into the outlet 21 without merging into the first passage.

A portion of the chamber 27 is surrounded by a detachable cover or cap 28 having a threaded nipple which is screwed into a complementary female portion at the upper end of the housing 25, as viewed in FIG. 2. The chamber 27 accommodates a first valve including an annular valve seat 31 defined by the housing 25 at the upper end of the axial bore 26, a plate-like valve member 30, and a helical valve spring 29 which biases the valve member 30 against the seat 31 so that the first passage is normally sealed and the air admitted through the service line 9 cannot enter the axial bore 26. The uppermost convolution of the valve spring 29 bears against the bottom portion of the cap 28, and the lowermost convolution of this spring bears against a retainer 29a which is tiltable on the valve member 30.

The motion transmitting member 33 constitutes a plunger which is reciprocable in the axial bore 26. This plunger is surrounded by an annular sealing ring 34 which is recessed into the cylindrical wall surrounding the lower end portion of the bore 26. The member 33 carries an annular collar in the form of a spilt ring 35 which can move into and from abutment with an internal stop shoulder 26a provided in the bore 26. When the collar 35 abuts against the stop shoulder 26a, the upper end face 36 of the member 33 is spaced from the valve member 30. The lower end portion 37 of the member 33 then extends into the chamber 42.

The cup-shaped lower part 45 of the housing 25 is detachable from the remainder of this housing and surrounds a portion of the chamber 42. This chamber accommodates a pressure-responsive second valve including a valve member in the form of a deformable diaphragm 43 whose marginal portion is clamped by an annular flange of the lower part 45. The underside of the diaphragm 43 abuts against a disk-shaped stiffener 47 which is biased by the uppermost convolution of a helical valve spring 46. The lowermost convolution of the spring 46 bears against a retainer 42 whose axial position may be adjusted by a bolt 49 which is screwed through the bottom wall of the cupped part 45. Thus, the bolt 49 constitutes a means for regulating the bias of the valve spring 46.

The lines 20 and 22 can be said to constitute a single line which contains the normally closed supply valve 50 and serves to connect the outlet 21 of the control valve assembly 14 with the brake cylinders 23 and 24.

The brake system which embodies the control valve assembly 14 of FIG. 2 operates as follows:

When the brake system is not defective, the pressure prevailing in the reservoir 11 of the trailer 6 is in the range of about 5.6 atmospheres absolute pressure. Such pressure is generated by the compressor (not shown) of the towing vehicle and is transmitted through the supply lines 5 and 10 via coupling elements 4, 8. The line 12 feeds compressed air through the inlet 13 and through the bores 41a, 41 into the chamber 42, and the pressure of about 5.6 atmospheres suffices to overcome the bias of the valve spring 46 so that the upper side of the diaphragm 43 moves away from the lower end portion 37 of the motion transmitting member 33. Therefore, the compressed air can penetrate through the blind bore 38 and through the diametral bore 39 to enter the axial bore 26 and the radial bore 40 on its way into the outlet 21 and through the supply line 20 all the way to the closed supply valve 50 in the load responsive valve 16.

If the operator desires to apply the brakes of the trailer 6, he steps on the brake pedal to admit compressed air into the service line 3 whence such air flows through the coupling elements 2, 7 and into the service line 9 of the trailer 6. The air flowing into the branch line 9a shifts the piston in the actuating or starting cylinder 17 so that the balance beam 16a is tilted in a counterclockwise direction, as viewed in FIG. 1, and causes the piston of the regulating cylinder 18 to open the supply valve 50 to the extent determined by the momentary position of the fulcrum 16b. At the same time, the discharge end of the service line 9 delivers compressed air into the chamber 27 of the housing 25. However, the spring 29 continues to bias the valve member 30 against the valve seat 31 so that air admitted to the chamber 27 cannot enter the axial bore 26. The air coming from the reservoir 11 and entering at 13 flows to the outlet 21 and through the supply line 20, through the open supply valve 50, through the feed line 22 and branches 22a, 22b, and into the brake cylinders 23, 24 so that the trailer 6 is braked with a force determined by the axial position of the piston 19a in the cylinder 19d of the adjusting device 19. It will be seen that, when the brake system functions properly and applies the brakes in the just described manner, the valve 16 is a true relay valve in that it receives impulses from a first source of compressed air (namely, from the reservoir of the towing vehicle 1 and the service line 9) and utilizes such impulses to open the path for compressed air coming from another source (namely, from the trailer reservoir 11 so that air coming from the second source can enter the brake cylinders 23 and 24.

If the pressure in the reservoir 11 drops to a predetermined minimum pressure, for example, to a pressure which is less than 4.5 or less than 4 atmospheres absolute pressure, the bias of the valve spring 46 overcomes the pressure which prevails in the chamber 42 and causes the diaphragm 43 to flex upwardly until the diaphragm abuts against an annular stop face or valve seat 44 at the lower end of the axial bore 26. This will happen if a line receiving air from the reservoir 11 has developed a leak, for example, a leak which is located downstream of the outlet 21 or in the line 12. The valve assembly 14 then automatically seals such leak by allowing the valve spring 46 to move the diaphragm 43 into abutment with the stop face 44 whereby the chamber 42 is sealed from the blind bore 38 and hence from the outlet 21. At a further drop of pressure, the diaphragm 43 shifts the motion transmitting member 33 upwardly, so that the upper end face 36 of the member 33 lifts the valve member 30 off the seat 31 and allows compressed air to flow from the inlet 15, through the aforementioned first passage, and into the outlet 21. In other words, the supply line 9 then delivers compressed air which flows through the control valve assembly 14, through the supply line 20, through the open supply valve 50, through the feed line 22 and its branches 22a, 22b, and into the brake cylinders 23, 24. It will be seen that, as soon as the pressure of air in the supply line 12 drops to below a predetermined minimum pressure, the reservoir 11 is automatically sealed from the outlet 21 and the motion transmitting member 38 responds to open the first valve 29–31 which then admits compressed air from the service line 9 and into the supply line 20. This means that pressure prevailing in the branch line 9a is substantially the same as pressure in the feed line 22. The quantity of compressed air which can flow through the supply valve 50 is again determined by the position of the fulcrum 16b, i.e., by the axial position of the piston 19a in the cylinder 19d of the adjusting device 19. During such emergency operation, i.e., when the brake cylinders 23, 24 receive fluid from the service line 9, the load responsive valve 16 merely performs the function of a pressure regulating valve because the air which transmits an impulse to the valve 16 also flows into the brake cylinders 23 and 24.

It will be seen that the control valve assembly 14 truly performs the function of a safety valve because it insures that the cylinders 23, 24 will receive compressed air not only when the pressure in the reservoir 11 remains above a predetermined minimum pressure but also when the reservoir 11 is leaky or when the connection between the reservoir 11 and the brake cylinders 23, 24 is defective and allows the pressure of air to drop below such predetermined minimum pressure. The just outlined function of the valve assembly 14 is of particular importance when the towing vehicle 1 is set in motion and the trailer 6 must be braked before the compressor of the towing vehicle has had a chance to raise the pressure of air in the reservoir 11 above 4 or 4.5 atmospheres absolute pressure. The trailer 6 is then simply braked by air which is admitted through the service line 9.

It is further clear that the improved brake system need not always be installed in or on a trailer. For example, the entire brake system may be installed on a tractor or truck if such vehicle is provided with a dual brake system and the manufacturer desires to provide a safety valve assembly or control valve assembly which will automatically shift from delivery out of a second reservoir to direct delivery of compressed fluid through the service line or lines whenever the supply line or lines are defective or whenever the second reservoir develops a leak.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a dual brake system for vehicles, particularly for trailers, a brake cylinder; a supply line and a service line each arranged to convey a compressed fluid; a control valve assembly including a housing having a first and a second inlet respectively connected with said service line and said supply line, an outlet, and first and second passages respectively connecting said outlet with said first and second inlets, said assembly further comprising a first valve for normally sealing said first inlet from said outlet, a second valve arranged to open in response to a predetermined minimum pressure at said second inlet to thus permit fluid to flow from said supply line to said outlet, and motion transmitting means for opening said first valve in response to closing of said second valve so that said outlet can receive fluid from said service line when the pressure in the supply line drops below said predetermined minimum pressure; a further line connecting said outlet with said cylinder; and a load responsive valve connected with said service line and including a normally closed supply valve provided in said further line, said load responsive valve also comprising means for opening said supply valve in response to admission of fluid into said service line and to the extent determined by the load upon the vehicle.

2. In a dual compressed-air brake system for vehicles, particularly for trailers, a brake cylinder; a supply line and a service line each arranged to convey compressed air from a separate source; a control valve assembly including a housing having a first and a second inlet respectively connected with said service line and said supply line, an outlet, and first and second passages respectively connecting said outlet with said first and second inlets, said assembly further comprising a first valve for normally sealing said first inlet from said outlet, a second valve arranged to open in response to a predetermined minimum pressure at said second inlet to thus permit compressed air to flow from said supply line to said outlet, and motion transmitting means for opening said first valve in response to closing of said second valve so that said outlet can receive compressed air from said service line when the pressure in the supply line drops below said predetermined minimum pressure; a further line connecting said outlet with said cylinder; and a load responsive valve connected with said service line and including a normally closed supply valve provided in said further line, said load responsive valve also comprising means for opening said supply valve in response to admission of compressed air into said service line and to the extent determined by the load upon the vehicle.

3. In a dual compressed-air brake system for vehicles, particularly for trailers, brake cylinder means; a service line and a supply line each arranged to convey a stream of compressed air; a control valve assembly comprising a housing provided with first and second inlets respectively connected with said service line and said supply line and an outlet, said housing defining first and second passages respectively connecting said outlet with said first and second inlets, a valve provided in said first passage for normally sealing said outlet from said first inlet, and means for opening said valve when the air pressure at said second outlet drops below a predetermined value; conduit means connecting said outlet with said brake cylinder means; and a load responsive valve connected with said service line, said load responsive valve comprising a normally closed supply valve provided in said conduit means and means for opening said supply valve in response to admission of compressed air into said service line and to the extent determined by the load upon the vehicle.

4. In a dual compressed-air brake system for vehicles, particularly for trailers, brake cylinder means; a service line and a supply line each arranged to convey a stream of compressed air; a control valve assembly comprising a housing provided with first and second inlets respectively connected with said service line and said supply line and an outlet, said housing defining first and second passages respectively connecting said outlet with first and second inlets, a normally closed first valve provided in said first passage for normally sealing said outlet from said first inlet, a normally open second valve provided in said second passage for normally permitting the flow of compressed air from said second inlet to said outlet, said second valve being arranged to close when the air pressure at said second inlet drops below a predetermined value, and means for opening said first valve in response to closing of said second valve; conduit means connecting said outlet with said brake cylinder means; and a load responsive valve connected with said service line, said load responsive valve comprising a normally closed supply valve provided in said conduit means, and means for opening said supply valve in response to admission of compressed air into said service line and to the extent determined by the load upon the vehicle.

References Cited by the Examiner

UNITED STATES PATENTS

| 1,633,756 | 6/1927 | Aikman | 303—25 |
| 3,210,132 | 10/1965 | Alfievi et al. | 303—29 |

FOREIGN PATENTS 660,745  11/1951  Great Britain.

EUGENE G. BOLTZ, *Primary Examiner.*